United States Patent Office 3,372,169
Patented Mar. 5, 1968

3,372,169
PREPARATION OF DIPHENYLMALEIC ANHYDRIDE AND DIPHENYLMALEIC ANHYDRIDE DIMER
John H. Fager, Cross River, N.Y., assignor to Union Carbide Corporation, a corporation of New York
No Drawing. Filed Mar. 29, 1966, Ser. No. 538,237
7 Claims. (Cl. 260—346.3)

ABSTRACT OF THE DISCLOSURE

A method of preparing diphenylmaleic anhydride dimer by reacting phenylacetic anhydride and an aromatic amine N-oxide in an inert solvent in the presence of light. The diphenylmaleic anhydride dimer produced therefrom is also novel. The invention also covers a method of preparing diphenylmaleic anhydride by reacting phenylacetic anhydride and an aromatic amine N-oxide in an inert solvent.

---

This invention relates to a novel method of preparing diphenylmaleic anhydride and diphenylmaleic anhydride dimer, the latter compound being a novel composition of matter. The diphenylmaleic anhydride and diphenylmaleic anhydride dimer prepared by the novel method of this invention may be unsubstituted or substituted at one or more ring positions, as desired.

In accordance with this invention, diphenylmaleic anhydride is produced by reacting phenylacetic anhydride with an aromatic amine N-oxide in an inert solvent. A typical aromatic amine N-oxide of utility for this purpose is pyridine N-oxide, in which instance the reaction may be illustrated by the following reaction equation:

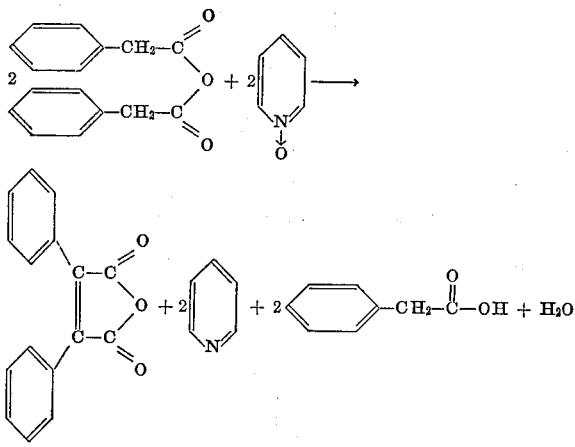

The diphenylmaleic anhydride can be photodimerized to a cyclobutane dianhydride, viz., diphenylmaleic anhydride dimer, in accordance with the following reaction equation:

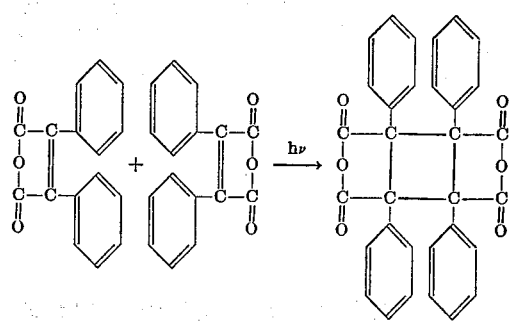

To prepare the diphenylmaleic anhydride dimer it is not necessary to first isolate the diphenylmaleic anhydride, although this could of course be done if desired, but rather the dimer can be prepared by merely exposing the phenylacetic anhydride/pyridine N-oxide reaction mixture to light.

The particular aromatic amine N-oxide employed as a starting material in the method of this invention is not critical. Thus, for example, the aromatic amine N-oxide may be unsubstituted or substituted with one or more alkyl groups. Where a substituted aromatic amine N-oxide is employed it is, however, preferred that it be free of substituents in the 2- or 6-position because of a competing rearrangement reaction. Specifically illustrative of aromatic amine N-oxides of utility for the purposes of this invention are compounds of the general formula:

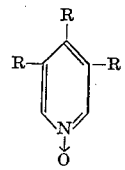

where each R is hydrogen or an alkyl group of 1 to about 10 carbon atoms, for example, pyridine N-oxide, 3-picoline N-oxide, 4-picoline N-oxide, 3,4-lutidine N-oxide, 3,5-lutidine N-oxide, 3,5-diethylpyridine N-oxide, 3-ethyl-5-butylpyridine N-oxide, 3,4,5-trimethylpyridine N-oxide, 3-(n-octyl)pyridine N-oxide, 3-(n-decyl)pyridine N-oxide, and the like.

The method of this invention is not limited to the use of phenylacetic anhydride as a starting material but is equally applicable to the use of substituted phenylacetic anhydrides to yield diphenylmaleic anhydride, or diphenylmaleic anhydride dimer, wherein the phenyl groups are substituted in one or more positions. Specifically illustrative of the phenylacetic anhydrides that may be employed as starting materials are compounds of the general formula:

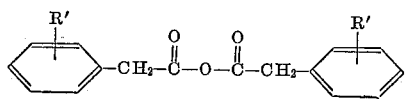

where R' is hydrogen, a halogen atom, a nitro group, an alkyl group of 1 to about 10 carbon atoms, or an alkoxy group of 1 to about 10 carbon atoms, for example, phenylacetic anhydride, p-methylphenylacetic anhydride, p-hexylphenylacetic anhydride, p-(n-decyl)phenylacetic anhydride, 3,5 - dimethylphenylacetic anhydride, p-methoxyphenylacetic anhydride, p-butoxyphenylacetic anhydride, p-nitrophenylacetic anhydride, 3,5 - dichlorophenylacetic anhydride, and the like.

Where a substituted phenylacetic anhydride, as described above, is employed as a starting material the resulting cyclobutane dianhydride will be of the formula:

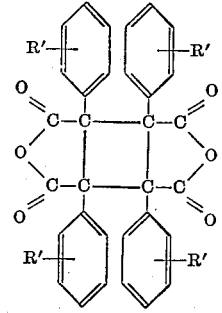

wherein R' is as defined hereinabove.

As pointed out hereinbefore, the reaction of the phenylacetic anhydride, or substituted phenylacetic anhydride, with the aromatic amine N-oxide to produce the diphenylmaleic anhydride or diphenylmaleic anhydride dimer in accordance with this invention is conducted in an inert solvent. Illustrative of suitable inert solvents for this purpose one may mention benzene, toluene, xylene, chloroform, carbon disulfide, and the like.

The reaction of the phenylacetic anhydride and aromatic amine N-oxide may be carried out at pressures from subatmospheric to superatmospheric and at temperatures from about 0° C., or less, to about 100° C., or more, preferably from about 20° C. to about 50° C., utilizing the reactants in equimolar amounts or with either reactant in excess. To prepare the diphenylmaleic anhydride will ordinarily require a reaction period of about 12 to about 48 hours, whereas to obtain the diphenylmaleic anhydride dimer, reaction periods of from several days up to several weeks may be necessary. The source of light used to effect the photodimerization is not critical so that ordinary daylight is sufficient.

Diphenylmaleic anhydride dimer and its derivatives, as described herein, are new compositions of matter. They are of particular utility as intermediates for the preparation of polyimides, polyamides and polyesters capable of forming films, fibers and coatings of high thermal stability. Thus, reaction of diphenylmaleic anhydride dimer with a stoichiometric quantity of a diamine, such as for example, p-phenylenediamine, m-phenylenediamine, ethylenediamine or hexamethylenediamine, will yield a linear polyimide; reaction with an excess of the diamine will yield a polyamide; and reaction with a glycol, such as for example, ethylene glycol, diethylene glycol, 2-ethylhexane-1,3-diol or hexylene glycol, will yield a highly crosslinked polyester.

The following examples are given to further illustrate the invention.

EXAMPLE 1

To a 1-liter flask, equipped with a gas inlet tube and a water condenser, there were charged 25.4 grams (0.1 mole) of phenylacetic anhydride, 9.5 grams (0.1 mole) of pyridine N-oxide, and 350 grams of anhydrous benzene. The mixture was heated at 50° C. for 5 days with nitrogen ebullition, the flask being exposed to ordinary daylight throughout the heating period. There were recovered from the reaction mixture 0.40 gram of diphenylmaleic anhydride, a pale green solid having a melting point of 156–157° C. In addition to the melting point determination, identification of the reaction product as diphenylmaleic anhydride was made on the basis of nuclear magnetic resonance and infrared spectra, fluorescence properties, the melting point of the anilino derivative, and the observation, agreeing with a report in the literature (G. Heller, Ann., 358, 349 (1908)), that an attempt to form the free acid by acidification of the corresponding sodium salt resulted in regeneration of the anhydride. Also recovered from the reaction mixture were 0.52 gram of diphenylmaleic anhydride dimer, a light orange solid with a melting point of 325° C. which was slightly soluble in hot benzene but insoluble in water, chloroform and ethanol. In addition to the melting point determination, identification of the reaction product as diphenylmaleic anhydride dimer was made on the basis of the following:

(1) The infrared spectrum showed bands at 1845 and 1774 cm.$^{-1}$, thereby indicating an anhydride structure;

(2) The infrared spectrum of the anilino derivative (melting point of 269.5–270.5° C.) showed bands at 1768 and 1712 cm.$^{-1}$, indicative of a cyclic imide structure and thereby evidencing that the starting compound was an anhydride;

(3) Treatment with boiling 10% aqueous sodium hydroxide gave a clear solution from which the dimer was regenerated upon acidification with hydrochloric acid, a characteristic which parallels that of diphenylmaleic anhydride; and (4) Photodimerization of diphenylmaleic anhydride by exposure of a solution of 2.0 grams in 25.0 milliliters of benzene to daylight at room temperature for 20 days resulted in formation of a solid material having a melting point and infrared spectrum identical to that of the reaction product of this example while storage of the solution of diphenylmaleic anhydride in benzene in the dark did not produce any precipitate after a 40-day period.

EXAMPLE 2

To a 500 milliliter Erlenmeyer flask, fitted with a stopper containing a drying tube, there were charged 25.4 grame (0.1 mole) of phenylacetic anhydride, 10.9 grams (0.1 mole) of 4-picoline N-oxide, and 250 grams of anhydrous benzene. The flask was allowed to stand at room temperature, exposed to daylight, for a period of 4 weeks, whereupon there were recovered 3.5 grams of diphenylmaleic anhydride having a melting point of 156–157° C. and 0.84 gram of diphenylmaleic anhydride dimer having a melting point of 325° C.

Although the invention has been illustrated by the preceding examples, it is not to be construed as limited to the materials employed therein, but rather the invention encompasses the generic area as hereinbefore disclosed.

What is claimed is:

1. As a composition of matter, diphenylmaleic anhydride dimer of the formula:

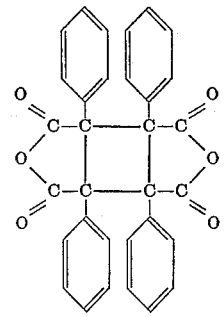

2. A method of preparing diphenylmaleic anhydride comprising contacting phenylacetic anhydride and an aromatic amine N-oxide of the formula

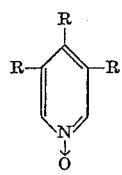

where each R is hydrogen or an alkyl group of 1 to about 10 carbon atoms in an inert solvent and recovering the diphenylmaleic anhydride produced thereby.

3. A method of preparing diphenylmaleic anhydride dimer comprising contacting phenylacetic anhydride and an aromatic amine N-oxide of the formula

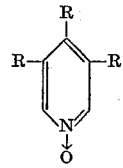

where each R is hydrogen or an alkyl group of 1 to about 10 carbon atoms in an inert solvent in the presence of light and recovering the diphenylmaleic anhydride dimer produced thereby.

4. The method of claim 2 wherein the aromatic amine N-oxide is pyridine N-oxide.

5. The method of claim 2 wherein the aromatic amine N-oxide is 4-picoline N-oxide.

6. The method of claim 3 wherein the aromatic amine N-oxide is pyridine N-oxide.

7. The method of claim 3 wherein the aromatic amine N-oxide is 4-picoline N-oxide.

No references cited.

NICHOLAS S. RIZZO, *Primary Examiner*.